United States Patent [19]

Okane et al.

[11] Patent Number: 5,636,616

[45] Date of Patent: Jun. 10, 1997

[54] FUEL SUPPLY APPARATUS FOR AN INTERNAL COMBUSTION ENGINE

[75] Inventors: Yukihiro Okane; Tomojiro Sugimoto; Kenji Ohkubo; Kazuhiro Minamitani, all of Toyota; Takeshi Matsuda; Kazuhiro Shinomiya, both of Kariya, all of Japan

[73] Assignee: Toyota Jidosha Kabushiki Kaisha, Tokyo, Japan

[21] Appl. No.: 579,979

[22] Filed: Dec. 28, 1995

[30] Foreign Application Priority Data

Dec. 28, 1994 [JP] Japan ..................... 6-327030

[51] Int. Cl.⁶ ..................... F02M 37/04
[52] U.S. Cl. ..................... 123/514; 123/509; 123/510; 137/549
[58] Field of Search ..................... 123/509, 514, 123/516, 510, 497; 137/549, 510, 565, 569, 570, 572, 574, 576

[56] References Cited

U.S. PATENT DOCUMENTS

| | | | |
|---|---|---|---|
| 5,070,849 | 12/1991 | Rich | 137/565 |
| 5,078,167 | 1/1992 | Brandt | 137/510 |
| 5,148,792 | 9/1992 | Tuckey | 137/569 |
| 5,195,494 | 3/1993 | Tuckey | 123/514 |
| 5,218,942 | 6/1993 | Coha | 123/514 |
| 5,289,810 | 3/1994 | Bauer | 123/514 |
| 5,392,750 | 2/1995 | Laue | 123/509 |
| 5,433,241 | 7/1995 | Robinson | 137/549 |
| 5,469,829 | 11/1995 | Kleppner | 123/514 |

FOREIGN PATENT DOCUMENTS

| | | |
|---|---|---|
| 5-263722 | 10/1993 | Japan . |
| 6-129325 | 5/1994 | Japan . |

*Primary Examiner*—Carl S. Miller
*Attorney, Agent, or Firm*—Cushman, Darby & Cushman IP Group of Pillsbury Madison & Sutro LLP

[57] ABSTRACT

A low-pressure fuel filter is disposed in a fuel-return pipe from the fuel pressure regulator. In a portion of the fuel-return pipe between the fuel pressure regulator and a fuel element of the low-pressure fuel filter, a bypass device which includes, for example, a jet pump or an aperture may be provided so that fuel can flow back to the fuel tank, bypassing the fuel filter when the fuel filter is blocked.

9 Claims, 4 Drawing Sheets

FUEL SUPPLY APPARATUS FOR AN INTERNAL COMBUSTION ENGINE

BACKGROUND OF THE INVENTION

1. Field of the Invention

The present invention relates to a fuel supply apparatus for an internal combustion engine, and more particularly relates to a fuel supply system including a fuel filter.

2. Description of Related Art

In a conventional fuel supply system for an internal combustion engine, as illustrated in FIG. 8 (as disclosed in Japanese Patent Publication HEI 6-129325), a fuel pressure regulator 108 is disposed in a fuel pipe 106 connecting a fuel pump 102 and a fuel injection valve 104. A high-pressure fuel filter 116 is disposed in a portion of the fuel pipe 106 between the fuel pressure regulator 108 and the fuel injection valve 104. Excess fuel is returned from the fuel pressure regulator 108 to a fuel tank 114 via a fuel-return pipe 110. A low-pressure suction filter 112 is provided to a suction port of the fuel pump 102.

However, the conventional fuel supply system has the following problems:

First, because the high-pressure fuel filter is disposed in a high-pressure portion of the fuel pipe between the fuel pressure regulator and the fuel injection valve, sealing requirements at pipe connecting portions are severe (leakage at the pipe connecting portions is not allowed because fuel leakage will seriously affect fuel injection), so the cost of piping is increased.

Second, because the high-pressure fuel filter is disposed in the portion of the fuel pipe between the fuel pressure regulator and the fuel injection valve, blockage of the high-pressure fuel filter and a change in pressure drop at the high-pressure fuel filter due to such blockage will directly affect fuel injection.

Third, because a large portion of fuel discharged from the fuel pump is returned to the fuel tank via the fuel-return pipe, and because no fuel filter is provided in the fuel-return pipe, fuel in the fuel tank is not cleaned. As a result, the suction filter is likely to cause blockage. If a coarse filter having large pores is used in the suction filter to prevent the filter from being choked, foreign particles in the fuel are not filtered, thereby advancing abrasion of the fuel pump.

SUMMARY OF THE INVENTION

An object of the invention is to provide a fuel supply apparatus for an internal combustion engine that can decrease piping costs, scarcely affect fuel injection (more particularly, scarcely increase fuel pressure) even if a fuel filter is blocked, and can effectively clean fuel in the fuel tank.

A fuel supply apparatus for an internal combustion engine according to the present invention includes a fuel pump, a fuel injection valve, a fuel pipe connecting the fuel pump and the fuel injection valve, a fuel pressure regulator communicating with the fuel pipe, a fuel-return pipe connected to the fuel pressure regulator, and a fuel filter disposed in the fuel-return pipe.

In the above-described fuel supply apparatus, because the fuel filter is disposed in the low-pressure fuel-return pipe, tight sealing is not required at a connecting portion between the fuel filter and the fuel-return pipe. Further, the fuel filter itself can be a low-pressure filter. As a result, the cost for piping is decreased.

Further, the fuel pressure acting on the fuel injection valve is determined by the fuel pressure regulator. Therefore, even if the low-pressure fuel filter is blocked and, as a result, the pressure in the fuel-return pipe changes, the pressure in the high-pressure fuel pipe upstream of the fuel-pressure regulator will be hardly affected while the pressure in the fuel-return pipe is lower than the pressure in the high-pressure fuel pipe. As a result, the blockage of the low-pressure fuel filter will hardly affect fuel injection.

Furthermore, because almost all of the fuel sent from the fuel pump returns to the fuel tank from the fuel pressure regulator via the fuel-return pipe, providing a fuel filter in the fuel-return pipe permits effective cleaning of fuel in the fuel tank.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENTS

Figure 1:
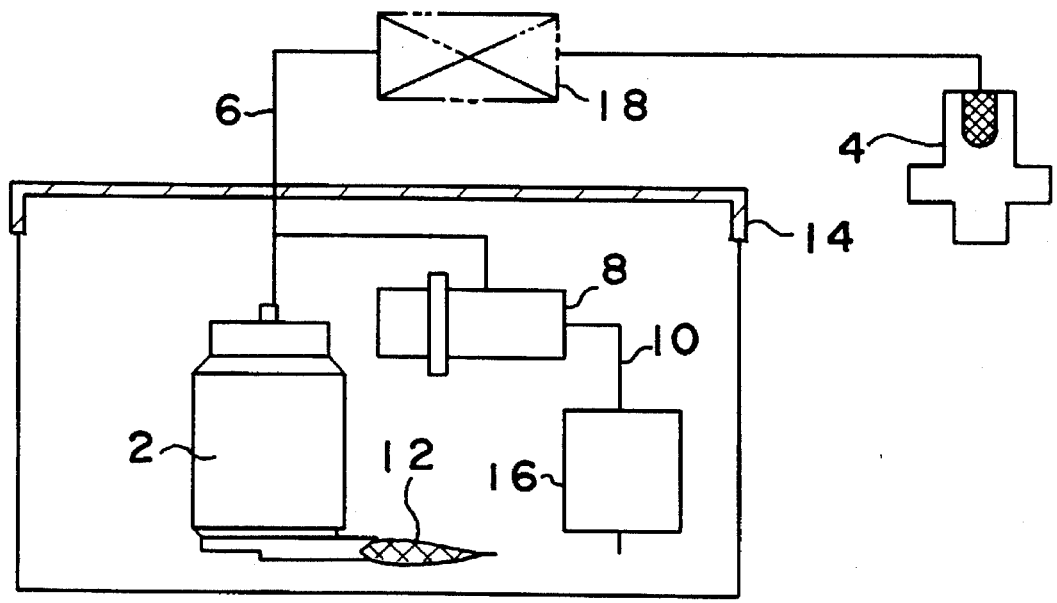
FIG. 1 is a system diagram of a fuel supply apparatus for an internal combustion engine in accordance with a first embodiment of the present invention.
Figure 2:
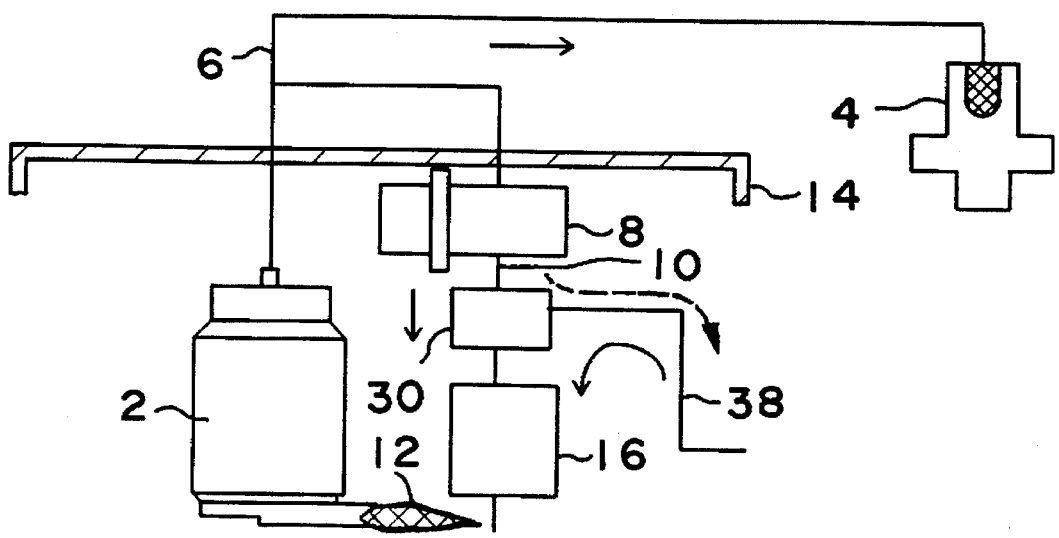
FIG. 2 is a system diagram of a fuel supply apparatus for an internal combustion engine in accordance with a second embodiment of the present invention.
Figure 3:
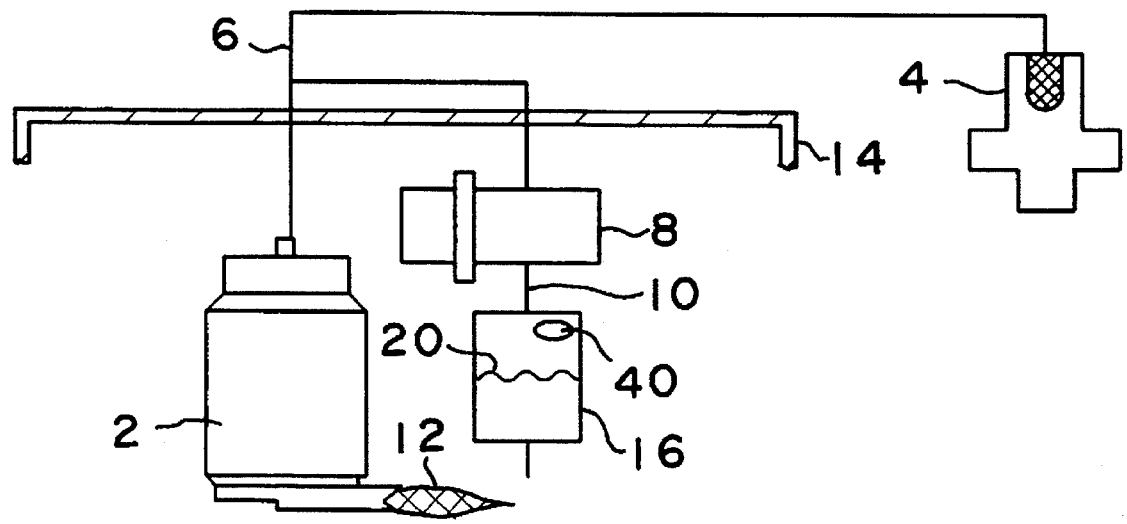
FIG. 3 is a system diagram of a fuel supply apparatus for an internal combustion engine in accordance with a third embodiment of the present invention.
Figure 4:
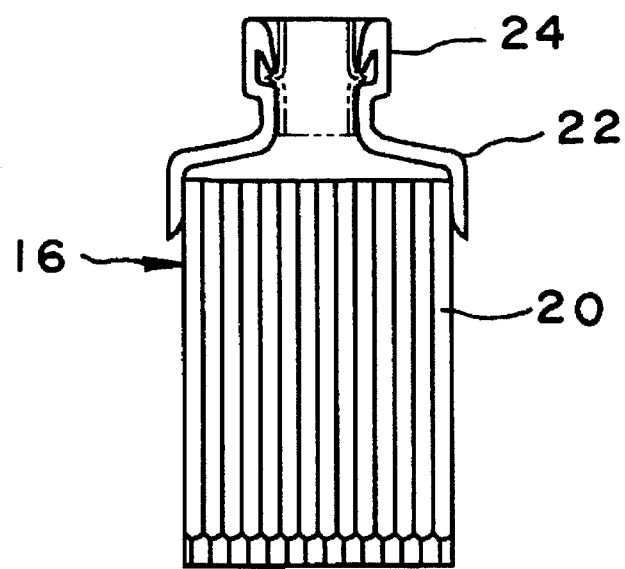
FIG. 4 is a cross-sectional view of a low-pressure fuel filter usable in the present invention.
Figure 5:
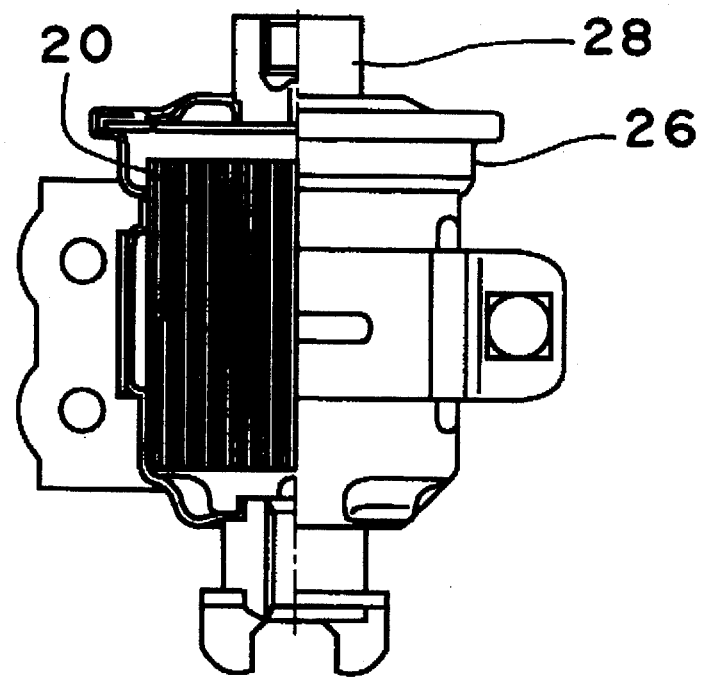
FIG. 5 is a cross-sectional view of a high-pressure fuel filter usable in the present invention.
Figure 6:
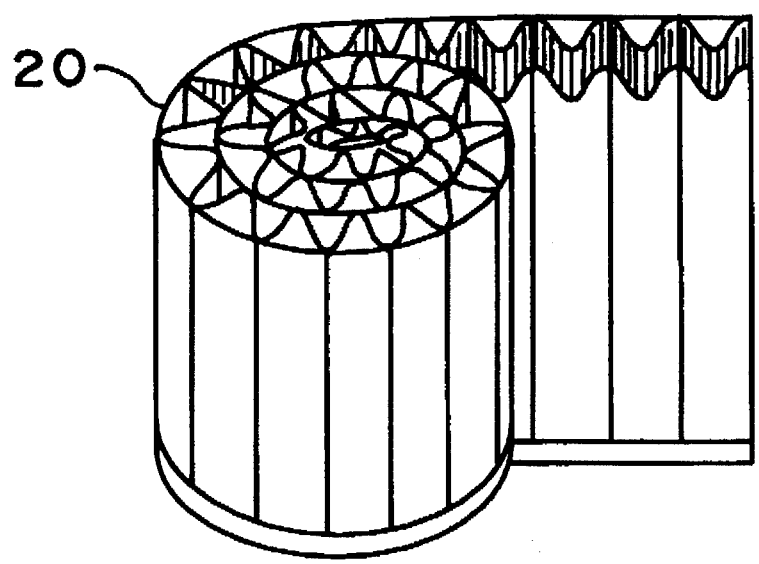
FIG. 6 is a perspective view of a filter element of the low-pressure fuel filter.

FIGS. 1, 2 and 3 illustrate a first, a second, and a third embodiment of the present invention, respectively. FIGS. 4-6 illustrate fuel filters which are used in the present invention. Portions common to all of the embodiments of the present invention are denoted with the same reference numerals through all of the embodiments of the present invention.

First, structures common to all of the embodiments of the present invention will be explained with reference to, for example, FIG. 1.

As illustrated in FIG. 1, a fuel supply apparatus for an internal combustion engine includes a fuel pump 2, a fuel injection valve (a fuel injector) 4, a fuel pipe (a high-pressure fuel pipe) 6 connecting the fuel pump 2 and the fuel injection valve 4, a fuel pressure regulator 8 communicating with the fuel pipe 6, a fuel-return pipe 10 connected to the fuel pressure regulator 8, a suction filter 12 provided at a suction port of the fuel pump 2, and a fuel tank 14. The fuel supply apparatus includes a fuel filter 16 disposed in the fuel-return pipe 10 extending from the fuel pressure regulator 8. The fuel-return pipe 10 is a low-pressure fuel pipe, and the fuel filter 16 is a low-pressure fuel filter. The fuel pump 2, the suction filter 12, the fuel pressure regulator 8, the fuel-return pipe 10, and the fuel filter 16 are disposed within the fuel tank 14.

The fuel pump 2 pumps (i.e., suctions) fuel in the fuel tank 14 through the suction filter 12. Return fuel from the fuel pressure regulator 8 returns through the fuel-return pipe 10 and the fuel filter 16 to the fuel tank 14.

The relief pressure of the fuel pump 2 is about 500–600 KPa (5–6 kg/cm$^2$), so that the fuel pump 2 has an ability to raise the fuel pressure to that relief pressure. However, because a control pressure of the fuel pressure regulator 8 is about 300 KPa (3 kg/cm$^2$), the fuel pressure in the fuel pipe 6 is controlled to be the control pressure of the fuel pressure regulator 8. Though the fuel pressure in the fuel-return pipe 10 is higher than the fuel pressure in the fuel tank 14 by the fuel pressure drop at the fuel filter 16, the fuel pressure in the fuel-return pipe 10 is low, and more particularly, not greater than about 100 Kpa (1 kg/cm$^2$).

A large portion of the fuel discharged from the fuel pump 2 is returned to the fuel tank 14 through the fuel pressure regulator 8, the fuel return pipe 10, and the fuel filter 16 at idling and at low and medium engine loads. More particularly, at idling, a ratio of an amount of fuel returned to the fuel tank 14 to an amount of fuel flowing to the fuel injection valve 4 is about 10.

In a portion of the high-pressure fuel pipe 6 between a divergence toward the fuel pressure regulator 8 and the fuel injection valve 4, a high-pressure fuel filter 18 may be provided. However, where fuel in the fuel tank 4 is sufficiently clean because of the low-pressure fuel filter 16 in the fuel-return pipe 10, the high-pressure fuel filter 18 does not need to be provided. Therefore, the high-pressure fuel filter 18 is optional.

For the low-pressure fuel filter 16, a filter as shown in FIG. 4 can be used. The filter 16 has a filter element 20 which is constructed by putting a corrugated filter paper on a flat filter paper and then winding the combination. The filter element 20 is fixed to a metal casing 22 at only one axial end of the filter element. The another end of the filter element 20 is free and is not covered by the casing. Fuel flows into the casing 22 at fuel inlet 24 and is cleaned when fuel passes through the filter element 20. A coupling portion of the fuel inlet 24 with the fuel-return pipe 10 is at a low fuel pressure.

When the high-pressure fuel filter 18 is provided, a filter as shown in FIG. 5 can be used for the high-pressure fuel filter 18. The fuel filter 18 has a filter element 20, all portions of which are housed in a metal casing 26. Fuel is cleaned when it passes through the filter element 20. A coupling portion of a fuel inlet 28 of the fuel filter 18 with the high-pressure fuel pipe 6 is at a high fuel pressure.

Next, structures unique to each embodiment of the present invention will be explained.

In the first embodiment of the present invention, as illustrated in FIG. 1, a portion of the high-pressure fuel pipe 6 between the fuel pump 2 and the fuel pressure regulator 8 is disposed within the fuel tank 14, so that even if leakage at the connecting portions with the fuel pressure regulator 8 happens to occur, the leaking fuel will drop to the fuel in the fuel tank 14.

In the second embodiment and the third embodiment invention, as illustrated in FIG. 2 and in FIG. 3, bypass devices 30 and 40 cause fuel to bypass the low-pressure fuel filter 16 to return to fuel collecting in the fuel tank 14, if the fuel filter 16 is blocked. Bypass devices 30 and 40 are provided at a portion of the fuel-return pipe 10 between the fuel pressure regulator 8 and filter element 20 of the fuel filter 16.

Figure 7:
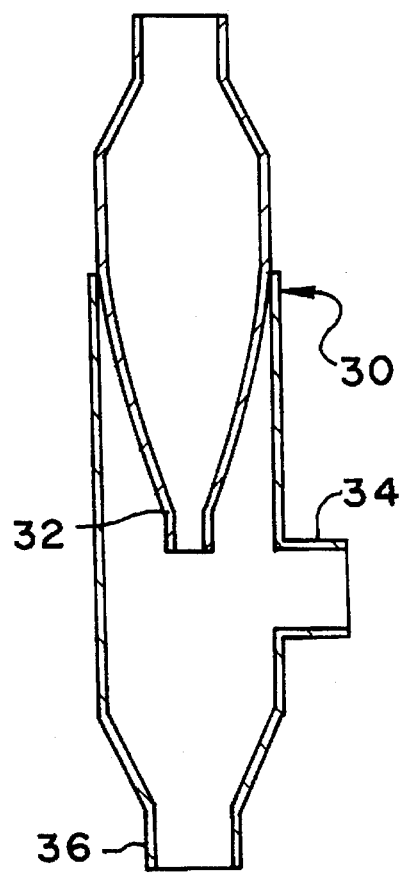
FIG. 7 is a cross-sectional view of a jet pump.
Figure 8:
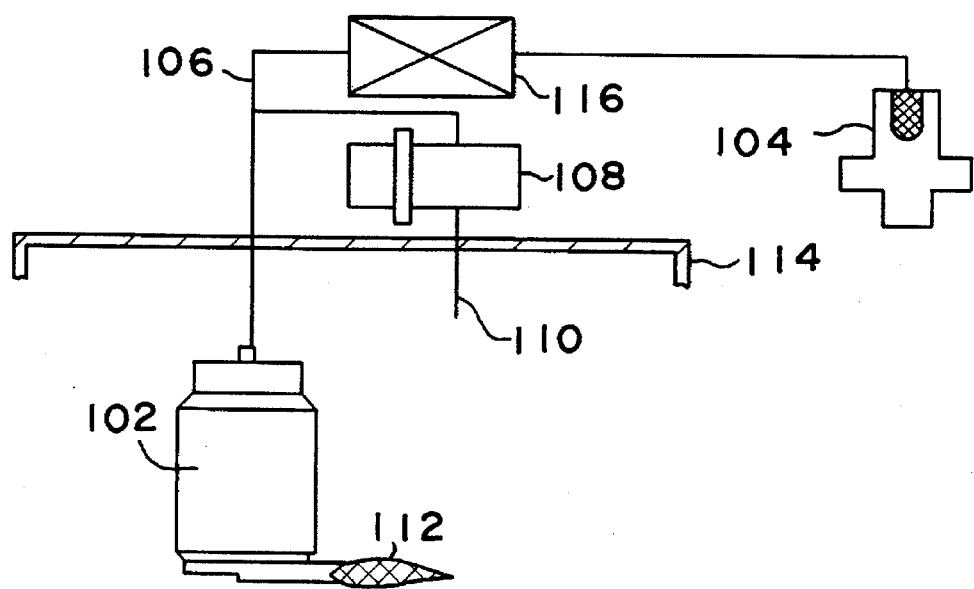
FIG. 8 is a system diagram of a conventional fuel supply apparatus for an internal combustion engine.

In the second embodiment of the present invention, as illustrated in FIG. 2, the bypass device 30 includes a jet pump. As illustrated in FIG. 7, the jet pump 30 includes, for example, a venturi 32, a fuel suction port 34, and a fuel discharge port 36. The venturi 32 communicates with the fuel pressure regulator 8. The fuel suction port 34 communicates with fuel within the fuel tank 14 via a fuel suction pipe 38, and the fuel discharge port 36 communicates with fuel within the fuel tank 14 via a portion of the fuel-return pipe 10. When fuel from the fuel pressure regulator 8 flows through the venturi 32, the flow speed of the fuel is raised, accompanied by a decrease in the static pressure of the fuel. The fuel with decreased static pressure suctions fuel through the fuel suction pipe 38, and a mixture of the fuel from the fuel pressure regulator 8 and the fuel from the fuel suction pipe 38 returns, through the fuel discharge port 36, to the fuel tank 14. As a result, fuel in the fuel tank 14 circulates through the fuel suction pipe 38 and the fuel discharge port 36 utilizing the energy of the fuel returned from the fuel pressure regulator 8. Therefore, not only the fuel returned from the fuel pressure regulator 8, but also the circulated fuel through the fuel suction pipe 38 (i.e., a large amount of fuel) is effectively cleaned.

If the fuel filter 16 happens to be blocked, the jet pump 30 loses its intrinsic function. More particularly, the fuel pressure inside the jet pump 30 changes to a static pressure, so that the fuel reversely flows: into the fuel suction pipe 38 from the suction port 34 and returns to the fuel tank 14. Therefore, the jet pump 30 functions as a bypass device which causes fuel to bypass the low-pressure fuel filter 16 when the fuel filter 16 happens to be blocked.

In the third embodiment of the present invention, as illustrated in FIG. 3, the bypass device 40 includes an aperture provided downstream of the fuel pressure regulator 8 and upstream of the filter element 20 of the low-pressure fuel filter 16.

The aperture 40 may be formed in a portion of the fuel-return pipe 10 between the fuel pressure regulator 8 and the low-pressure fuel filter 16 or may be formed in a portion (for example, the filter casing) of the low-pressure fuel filter 16 upstream of the filter element 20.

Next, operation and advantages of the apparatus according to the present invention will be explained.

First, operation common to all of the embodiments of the present invention will be explained.

Fuel in the fuel tank 14 passes through the suction filter 12 and is raised in pressure by the fuel pump 2. Then, the fuel is regulated in pressure to a predetermined pressure by the fuel pressure regulator 8. Only the amount of fuel that is consumed by the engine is supplied to the fuel injection valve 4. Excess fuel is returned from the fuel pressure regulator 8 through the fuel-return pipe 10 to the fuel tank 14.

Because the low-pressure fuel filter 16 is disposed in the fuel-return pipe 10 in which a relatively low pressure (lower than 100 KPa) exists, an extremely tight seal is not required at the connecting portion between the low-pressure fuel filter 16 and the fuel-return pipe 10, and a pressure-proof structure is not required to surround the low-pressure fuel filter 16 itself. As a result, the piping cost, including the fuel filter cost, is low.

Further, even if pressure in the fuel-return pipe 10 connected to the fuel pressure regulator 8 varies, the varying pressure hardly affects the pressure on the high pressure side of the fuel pressure regulator 8. Therefore, even if the low-pressure fuel filter 16 is blocked and raises the pressure in a portion of the fuel-return pipe 10 upstream of the fuel filter 16, the raised pressure does not significantly affect fuel injection pressure and fuel injection amount while the raised pressure is lower than the pressure on the high pressure side of the fuel pressure regulator 8. Accordingly, the air-fuel ratio of the engine does not become over-rich.

Furthermore, because a larger amount of the fuel flows in the fuel-return pipe 10 than in the fuel pipe 6 to the fuel injection valve 4, and because the low-pressure fuel filter 16 is disposed in the fuel-return pipe 10, all of the fuel in the fuel tank 14 is effectively cleaned. Therefore, if the fuel is sufficiently cleaned by the low-pressure fuel filter 16 only, high-pressure fuel filter 18 need not be provided in the high-pressure fuel pipe 6. Further, since the suction filter 12 is unlikely to be blocked, it is not necessary to use coarse filter element in the suction filter 12. Therefore, abrasion of the inside surface of the fuel pump 2 due to foreign particles in fuel is prevented.

Furthermore, since the fuel pressure regulator 8, the low-pressure fuel filter 16, and the fuel-return pipe 10 are disposed within the fuel tank 14, any fuel leakage occurring at the connection between those parts will cause leaking fuel to drop directly into the fuel tank 14.

Operation and advantages unique to each embodiment of the present invention will now be explained.

In the first embodiment, the portion of the high-pressure fuel pipe 6 connecting the fuel pump 2 and the fuel pressure regulator 8 is disposed within the fuel tank 14. Therefore, even if fuel leakage occurs at the connecting portion between the fuel pipe 6 and the fuel pressure regulator 8, the leaking fuel will drop directly into the fuel tank 14.

In the second embodiment of the present invention, a bypass device which includes the jet pump 30 is provided, so that if the low-pressure fuel filter 16 is blocked, fuel from the fuel-pressure regulator 8 can return to the fuel tank 14 through the suction port 34 of the jet pump 30. As a result, pressure in the fuel-return pipe 10 is prevented from increasing excessively to prevent the air-fuel ratio of the engine from being over-rich. Further, in a normal operating condition where the low-pressure fuel filter 16 is not blocked, fuel can be circulated through the jet pump 30 utilizing energy of the return fuel from the fuel pressure regulator 8. Therefore, a large amount of fuel passes through the low-pressure fuel filter 16 to keep most, if not all, of the fuel in the fuel tank 14 clean.

In the third embodiment of the present invention, a bypass device 40 which includes an aperture is provided. When the low-pressure fuel filter 16 happens to be blocked, fuel flows through the aperture 40 to prevent pressure in the fuel-return pipe 10 from increasing excessively and to prevent the air-fuel ratio of the engine from being over-rich.

Although the present invention has been described with reference to specific exemplary embodiments, it will be appreciated by those skilled in the art that various modifications and alterations can be made to the particular embodiments shown without materially departing from the novel teachings and advantages of the present invention.

Accordingly, it is to be understood that all such modifications and alterations are included within the spirit and scope of the present invention as defined by the following claims.

What is claimed is:

1. A fuel supply apparatus for an internal combustion engine comprising:

a fuel pump;

a fuel injection valve;

a fuel pipe connecting said fuel pump and said fuel injection valve;

a fuel pressure regulator communicating with said fuel pipe;

a fuel-return pipe connected to said fuel pressure regulator; and a fuel filter disposed in said fuel-return pipe;

a fuel tank, wherein said fuel pressure regulator, said fuel filter and said fuel-return pipe are disposed within said fuel tank;

said fuel filter comprising a filter element and a bypass means, said bypass means being provided at a portion of said fuel-return pipe between said fuel pressure regulator and said filter element of said fuel filter, for causing fuel to bypass said fuel filter to return to said fuel tank when said fuel filter is blocked.

2. An apparatus according to claim 1, wherein said fuel filter comprises a low-pressure filter.

3. An apparatus according to claim 1, further comprising a high-pressure filter disposed in said fuel pipe between said fuel pressure regulator and said fuel injection valve.

4. An apparatus according to claim 1, wherein a portion of said fuel pipe connecting said fuel pump and said fuel pressure regulator is disposed within said fuel tank.

5. An apparatus according to claim 1, wherein said bypass means comprises a jet pump.

6. An apparatus according to claim 5, further comprising a fuel suction pipe, wherein said jet pump comprises a venturi, a fuel suction port, and a fuel discharge port, said venturi communicating with said fuel pressure regulator, said fuel suction port communicating with fuel within said fuel tank via said fuel suction pipe, said fuel discharge port communicating with fuel within said fuel tank via a portion of said fuel-return pipe.

7. An apparatus according to claim 1, wherein said bypass means comprises aperture means provided downstream of said fuel pressure regulator and upstream of said filter element of said fuel filter.

8. An apparatus according to claim 7, wherein said aperture means comprises an aperture formed in a portion of said fuel-return pipe between said fuel pressure regulator and said fuel filter.

9. An apparatus according to claim 7, wherein said aperture means comprises an aperture formed in a portion of said fuel filter upstream of said filter element of said fuel filter.

* * * * *